United States Patent
Van Dyke

[19]

[11] Patent Number: 6,059,501
[45] Date of Patent: May 9, 2000

[54] LOCKING RING DEVICE

[76] Inventor: Peter F. Van Dyke, 13011 S. 82nd Ct., Palos Park, Ill. 60464

[21] Appl. No.: 08/949,197

[22] Filed: Oct. 10, 1997

[51] Int. Cl.[7] .............................. F16B 39/24; F16B 43/02
[52] U.S. Cl. ......................... 411/160; 411/369; 411/504; 411/542
[58] Field of Search .................................. 411/160, 161, 411/162, 163, 366, 368, 369, 504, 542

[56] References Cited

U.S. PATENT DOCUMENTS

| | | |
|---|---|---|
| 249,383 | 11/1881 | Moore . |
| 299,977 | 6/1884 | Garvey .................... 411/161 |
| 464,301 | 12/1891 | Harvey . |
| 467,627 | 1/1892 | Brachmann . |
| 493,213 | 3/1893 | Herman . |
| 510,708 | 12/1893 | Read . |
| 734,579 | 7/1903 | Lenholt . |
| 1,245,907 | 11/1917 | Hand . |
| 1,668,025 | 5/1928 | Olson ..................... 411/163 |
| 1,874,597 | 8/1932 | Olson ..................... 411/162 |
| 1,900,195 | 3/1933 | Olson . |
| 1,999,082 | 4/1935 | Buechting . |
| 2,089,924 | 9/1937 | Legge . |
| 2,867,824 | 1/1959 | O'Connor . |
| 3,170,701 | 2/1965 | Hoover ................... 411/542 |
| 3,370,632 | 2/1968 | Kubokawa . |

OTHER PUBLICATIONS

ASA B27.1–1965 American Society of Mechanical Engineers, Lock Washers, 1965, pp. thru 18.
Thomas E. French, revised by Charles J Vierck, Engineering Drawings, New York and London, McGraw–Hill book Company, seventh edition 1947, p. 81, geometric shapes Fig. 5–69, classification thereof.
Noah Webster, Webster's New World Dictionary of the American Launguage, second edition, David B. Gurlnik Editor in Chief, William Colins+World Publishing Company INC., Printed in United States of America, p. 1104, "pol.y-.gon: a closed plain figure, esp one with more than four sides and angles—".

*Primary Examiner*—Neill Wilson
*Attorney, Agent, or Firm*—Robert H. Resis; Banner & Witcoff, Ltd.

[57] ABSTRACT

Round spring wire (20) FIG. (1) formed into concave tri-elliptic wire (22) FIG. (2-A) and processed to include reversing wave crests (24) FIG. (3-A) having not opposed crest contact (28) FIG. (3-B) requires forming into ring or shape and heat treated as completed elastic form of locking ring device. Unique featured locking of joints and locking of standard fasteners is provided by continuous elastic internal beaming in combination with proportional penetration of joint surfaces by a multitude of relatively sharp reversing wave crests, which are always erect. Useful form is readily shaped and size configured in flat plane such as essentially round form of locking ring device (34) FIG. (4). The locking ring device is used for locking joint by curl formed flange (47*b*) FIG. (5-B), for plural use in locking of joint by single formed rivet (59) FIG. (6-B), for plural locking of joint by single screw thread fastener such as socket cap screw (78*a*) FIG. (7-A) and for either left hand or right hand threaded nut (85) FIG. (7-B), for combined sealing and locking with sealing locking (91) FIG. (8-A) surrounded by molding compound (92) FIG. (8-A), and for unitized locating and gripping plural fasteners by forming into a locking polyring (93) FIG. (9). A useful straight form of the locking ring device has use in between properly grooved members (96) FIG. (10) as straight locking key (99) FIG. (10), where restraining lateral and longitudinal movement or combinations offers improved replacement for a square or rectangular section machine key.

40 Claims, 3 Drawing Sheets

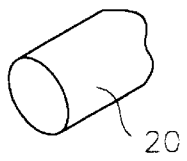
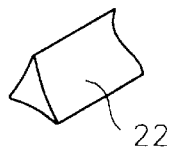
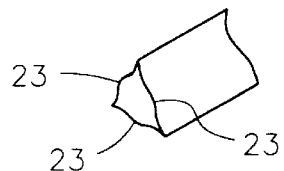
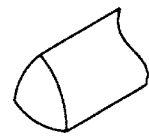
FIG.1  FIG.2-A  FIG.2-B  FIG.2-C
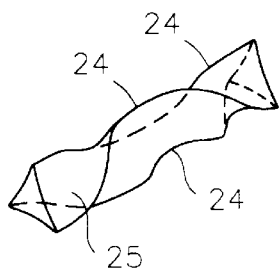
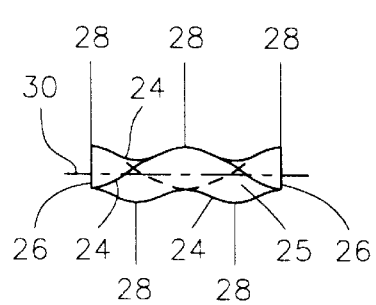
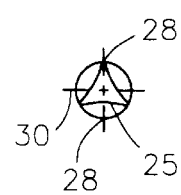
FIG.3-A  FIG.3-B  FIG.3-C
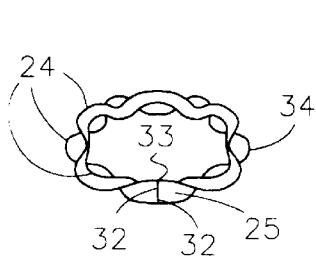
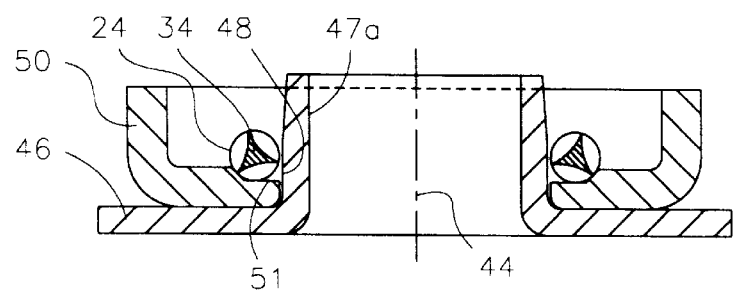
FIG.4  FIG.5-A
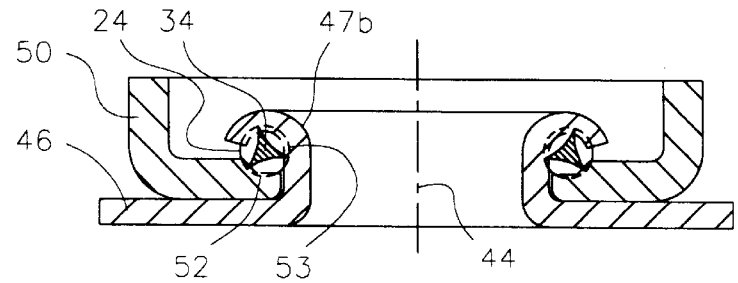
FIG.5-B

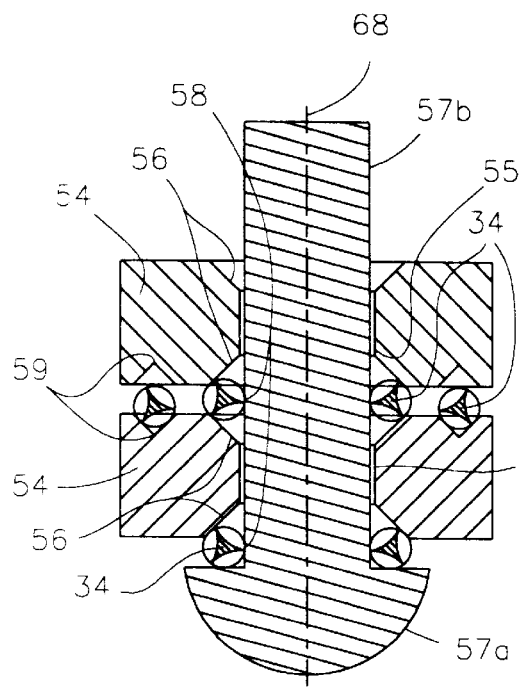
FIG.6-A
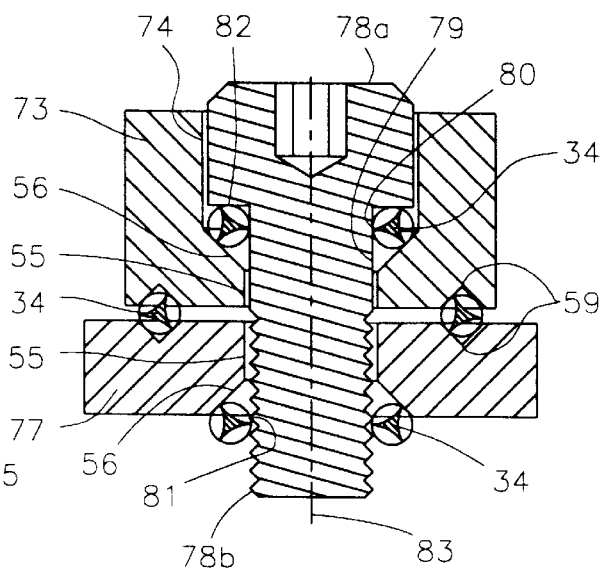
FIG.7-A
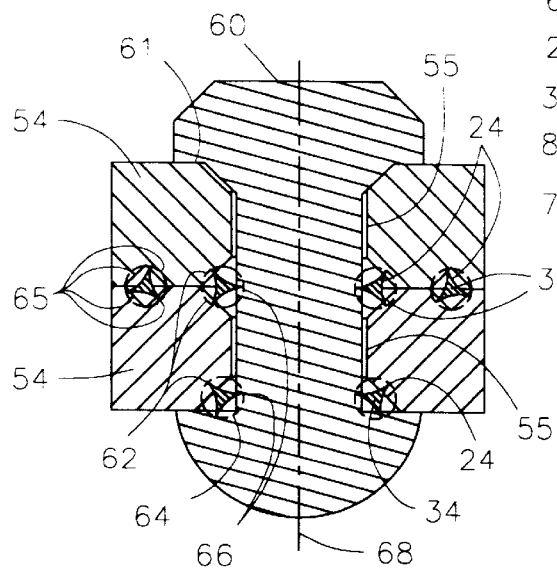
FIG.6-B
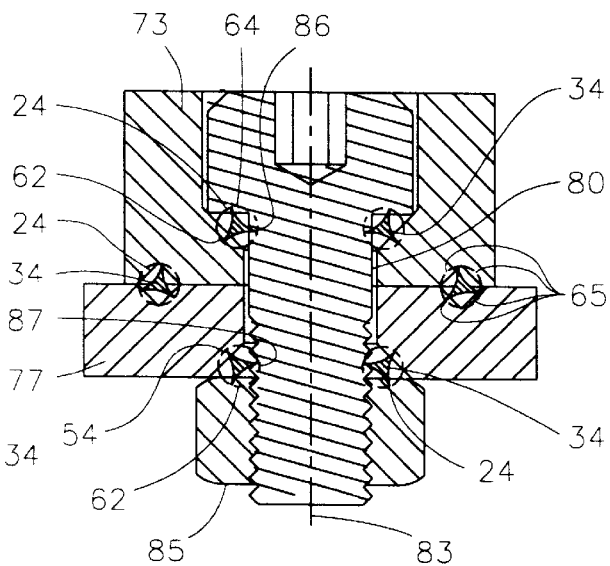
FIG.7-B

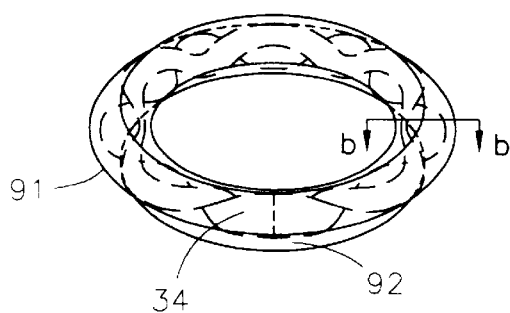
FIG.8-A
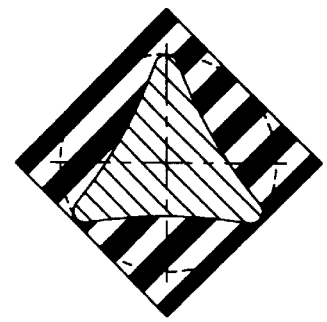
FIG.8-B
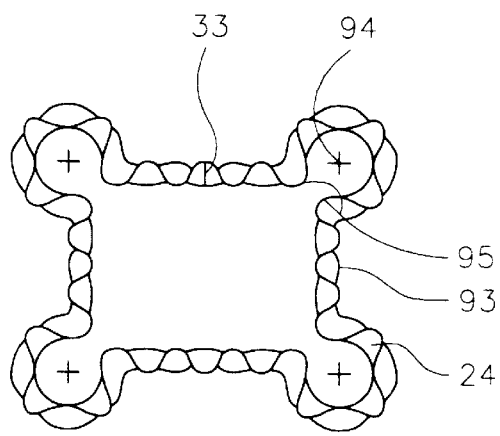
FIG.9
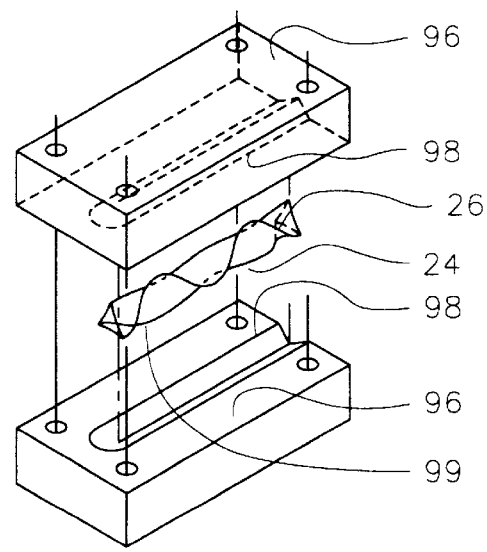
FIG.10

LOCKING RING DEVICE

CROSS-REFERENCES TO RELATED APPLICATIONS

Not Applicable

FEDERALLY SPONSORED RESEARCH OR DEVELOPMENT

Not Applicable

MIRCOFICHE APPENDIX

Not Applicable

BACKGROUND OF INVENTION

Set forth are two parts of the Background of Invention which include Technical Field and Background Art.

1. Technical Field

This invention pertains generally to lock washers of expanded, threaded, driven, headed, tool formed, or locked threaded fastener, class 411, and specifically a locking means made from wire material.

2. Background Art

A lock washier is the most economical locking means known. Usually it is an extra added device used to nut lock, or screw lock. Current in use lock washer specifications are contained in American Standard ASA B27.1-1965, internal-external tooth and helical spring lock washers. However, even though widely used, these lock washers have several disadvantages and limitations, as do known art lock washers. Generally, two lock washer material forms are predominant, wire or bar stock material and sheet stock material.

Nut lock patents relating to wire forms of twisted bar materials relative to this invention are included in the following issued patents:

George H. Moore Nov. 8, 1881 U.S. Pat. No. 249,383: WASHER FOR LOCKING NUTS ON BOLTS, consisting of steel axially twisted rectangular merchant quality bar cut into lengths then formed onto ring shape. It has welded closed or open ends, hardened spiral edges which are rigid or inflexible, not to operate as a spring, with optional bar shapes as triangular or hexagon. Original use shown on railroad rail fish plate bolt with threaded nut. Therein, the severe service requirement at elongated fish plate holes needed for rail thermal expansion resulted in improvement patented by:

Alfred H. Read Dec. 12, 1893 U.S. Pat. No. 510,708: NUT LOCK, improvements on George H. Moore patent, polygonal section (5 sided bar shown in patent drawing) of twisted rod or bar hardened and of open ring ends sprung in opposite directions one beveled to form biting corner one end bent and doubled back forming lug portion projecting outward to keep from entering elongated fish plate hole while turning with nut. Nut lock shown has added lower flange for joint stability, but rail movement and repeated hammering were problems, addressed later by:

John E. Lenholt Jul. 28, 1903 U.S. Pat. No. 734,579: NUT LOCK, also shown for rail joint having twisted angular bar ring with open ends sprung in opposite directions, wherein nut has concentric groove featuring inner groove face that is caused to compress against bolt threads by twisted bar edges wedged vertically within smaller size of groove, and also onto the fish-plate surface against which it rests. (Elongated holes not mentioned).

Townsend Hand Nov. 18, 1917 U.S. Pat. No. 1,245,907: NUT-LOCK, also for rail joint with wedged fish plate, wherein spiral threads or grooved rod (multiple thread rod shown), left hand coarse spiral opposite to hand of bolt threads, with ends offset to each other laterally and ring having split ends in washer plane, separated and pointed, and with washer having additional split intermediate in ring plane and separated. Firm and steady pressure between nut and fish plate is explained by splits in resilient material of nut-lock.

Carl G. Olson Mar. 7, 1933 U.S. Pat. No. 1,900,195: SCREW LOCKING ELEMENT, of single strip of elongated wire stock of polygonal section (square shown) and selectively twisted of multiple concentric rings provided with a plurality of teeth for engaging the work in an annular construction formed with a plurality of adjacently positioned coils with up turned sharp ends. Additionally, terminal section not twisted adapted to receive the free extremity of a conductor is contemplated and binding material is interposed between annular surface of outer and inner annular sections.

These above patents show twisted bar edges spiraled or not. Therein spiral rigid edges are opposed, opposite each other. Thus, rigidly presenting washer like spacing, between joint member surface and nut. All show edge angle 90 degrees or more. Ring ends are shown sprung out of plane, chamfered, sharpened, split, extended, coiled or prepared. They mostly depend upon ends biting effects and combined rigid edge contacting for intended locking.

Nut lock patents of not twisted split spring for nut-lock washers are shown following:

William P. Brachmann Jan. 26, 1892 U.S. Pat. No. 467,627: NUT LOCK, an improved lock washer, partly flat washer lightly spherical split ring with sharp special enlarged inclined biting tooth on one side only ends out of body plane to achieve spring action. Used for fish plate rail joint on bolt between plate and nut face, for nut being "screwed up" to tighten but not "unscrewed".

John C. Herman Mar. 7, 1893 U.S. Pat. No. 493,213: NUT LOCK, improvement in nut locks, consisting X shape section helically coiled spring material out of plane split ring having ends chamfered for biting surfaces in two places each end. Used for fish plate to nut locking, no elongated holes mentioned.

Elder E. Legge and Leonard C. Peskin Jun. 17, 1935 U.S. Pat. No. 2,089,924: COMBINED SPRING WASHER AND NUT LOCK, for severe and frequent vibration structures such as rail fastening and the like. Helio-conical plural spiral coiled strip of rectangular or elliptical section with sharp top and bottom edges of overlapping convolutions where upon joint closure forces offered cause crimped portions of the helix and then frictional resistance and internal pressure of washer produce hoop tension and bending within nesting adjacent convolutions, where relatively sharp edges engage the nut and bearing surfaces.

Masaharu Kubokawa Feb. 27, 1968 U.S. Pat. No. 3,370,632: LOCKING WASHERS comprising elastic far X section with resilient deformable 180 degree corners and 90 degree circular arcs as split helical ring with axially displaced ends initial flattening and secondary deformation of elastic X section by compression force in tightening of nut causes ring section deformation of corners within limit or elasticity.

Hayward A. Harvey Dec. 1, 1891 U.S. Pat. No. 464,301: RESILIENT SPIRAL WASHER AND MAKING OF THE SAME, provided quadrangular section with ratchet-shaped teeth transforming into curved ratchet or gouge shaped teeth upon coiling in to split ring shape and at tightening of nut, having teeth which may be or not be notched which are impacting nut surface and impacting object surface at intervals across either or both faces and tangential to circle of nearly the same diameter as the inside of the spiral.

Rudolph Buechting Apr. 23, 1935 U.S. Pat. No. 1,999,082: LOCK WASHER AND METHOD OF PRODUCING SAME, helical split ring angled or axially directed and centrally grooved with ribs corrugated radially milled on faces or face of a rectangular after coiling keystone section as to prevent radial spreading. Featured end has a pair of partial width circumfrentially directed cutting jaws and ribs intended to wear grooves in nut and work faces upon tightening nut. Method of production is by patent granted to G. K. Garrett, U.S. Pat. No. 1,560,228, excepting grooved faces of keystone section.

John B. O'Connor Jan. 13, 1959 U.S. Pat. No. 2,867,824: METHOD FOR MAKING SHEET MATERIAL SPLIT-RING LOCK WASHERS, helical split ring with sharp beveled ends of U section formed in continuous progressive roll forming line from coil of strip made to be spatially scored and notched by intermittent punch press.

State or the art and prior art references also include the following:

OWEN F. GARVEY Jun. 10, 1884 U.S. Pat. No. 299,977: WASHER, constructed to provide three or more arched sections with raised projecting radial edges of sharp points with opposite side edges and arches corresponding to provide resilient engagement upon flattening. This sheet stamped washer is not made from wire stock.

CARL S. OLSON May 1, 1928 U.S. Pat. No. 1,668,025: LOCK WASHER, sheet metal stamped annular ring with outer peripheral integral sharp pairs of teeth projecting out of plain disposed intermediate on other side to produce a wavy form when compressed.

Carl S. Olson Aug. 20, 1932 U.S. Pat. No. 1,874,597: LOCK WASHER, provides plural radial locking elements consisting of twisted square wire wherein inner and outer loops connect adjacent radial sections which may be alternately disposed out of plane. The multitude of loops with radial locking elements as represented would not practically fit under a standard hex nut without the wire cross section being minuscule, wherein tightening forces could considerably expand portions of the lock washer radially and possibly out from under the nut.

JOHN W. HOOVER. Feb. 23, 1965 U.S. Pat. No. 3,170,701: SEALING WASHER, pressure sealing composite metallic sheet metal or non metallic ring with a integral mooring portion having transverse web openings which allow pressure molding of elastomeric material through web openings and interconnecting the mooring ring. Elastomer is configured to provide sealing washer centering by closely approximating bolt diameter and also to provide sealing lips.

Known art lock washer disadvantages follow:

1. Standard ASA helical spring type locking only begins as back up loosening starts to allow end tooth to engage. With failure to engage an end tooth at either nut face or at work face, locking fails. Minimal spring engagement is evidenced by light, regular, heavy duty, and extra heavy duty, meaning more material is used due to weak cross section thickness. Spring type locking depends on friction of initial fastener tightening for joint security. Spring type are primarily used as nut lock, excepting high collar type, which is a screw lock. Both small sizes and large sizes have only one end tooth per side.
2. Spring and tooth types become flat in tightened joint, so both known types behave like a flat washer under tightened nut.
3. Split spring types easily tangle at splits with other like lock washers in packages and bulk storage bins.
4. Both types readily fall off fastener in below horizontal screw positions, so they require hand holding while starting nut.
5. Spring and tooth types are ineffective in severe service and severe vibration conditions.
6. Both types generally have larger outside diameter than fastener head or nut.
7. Both types have thickness, requiring extra bolt length.
8. Both types add weight to fastened joint.
9. Both types are assembles visible under fastener head or nut.
10. Both types have edges angle, generally 90 degrees.
11. Tooth type manufacture makes scrap from hole and skeleton.
12. Tooth type cost 42% more than spring type, ½ inch size 1000 lot plain carbon material.

OBJECTS AND ADVANTAGES

Accordingly, several objects and advantages of my invention are herein included:

Locking ring prevents back up loosening from starting by means of constant resilient engagement. Not as in present art locking, which generally attempts locking after initiation of loosening, has in flattened teeth of tooth type or flattened split end of helical spring type lock washers.

Locking ring locking is independent of friction or left or right hand of twisted wire which migrates upon tightening.

Locking ring with joined or abut ends is tangle free.

Locking ring is designed to stay on fastener by gripping shank, or if required may be made for usual loose fit.

Locking ring is effective in severe service vibration.

Locking ring is not larger in outside diameter than screw or bolt head, made possible by efficient use of material.

Locking ring can be assembled for use with common standard fasteners and not increase the joint thickness in use.

Locking ring has less weight than known art devices.

Locking ring can be assembled as not visible.

Locking ring edge angle of penetration is sharper than existing usual 90 degree or all angle of known lock washers.

Locking ring is made by scrapless processes.

Locking ring has material utilization efficiency.

Advantages and features of locking rings are highlighted by some comparison to plain flat washers, tooth, or spring lock washers. Plain flat washer use under bolt head or nut extends bearing surface area without locking. Tooth and spring type lock washers are not quite as large in diameter as plain flat washers, but are also used to extend bearing surface area. Standard fastener thread and body easily pass through clearance hole provided in flat washers and known art lock washers, so they can also fall off thread of downward positioned fastener.

Locking ring has several advantages and has several features not found in prior art.

Twelve advantages of a locking ring are:

First, that sharp crests actively and positively engage joint work surfaces continuously. The quantity of contacting crests made available is by design in choosing pitch length of axial reversed twists.

Second, sharp crests do not become flat in joint, thereby eliminating dependance on friction for initial locking.

Third, tangle free round formed locking ring in flat plane has fusion joined ends or abut ends that will not interconnect.

Fourth, falling off fastener is eliminated by design of size of slight elliptical or faceted polygonal essentially round shape for joined end rings, and sized so that abut end rings may spring open slightly for gripping onto standard fastener shank or thread.

Fifth, locking during severe vibration is effected by means of a multitude of sharp crests, each having continuous spring engaged contact with work and fastener surfaces.

Sixth, outside diameter of locking ring is equal or less than fastener head or nut and also less than known art devices.

Seventh, can be used in beveled openings to have no assembled joint thickness, therefor saving bolt length.

Eighth, uses less material volume than standard or known art lock washers. Compared to regular series spring type, a locking ring saves 70% material volume for ½ inch screw size. Compared to regular series tooth type, a locking ring device saves 45% volume or saves 74% of material for ½ inch screw size, therefor weight is less.

Ninth, can be assembled not visible by use in beveled opening.

Tenth, deep penetration is positive by relatively sharp crests.

Eleventh, manufacture of wire material and shape forming uses continuous scrapless processes.

Twelfth, estimated at half the cost of spring type and at quarter the cost of tooth type.

Thirteen new features of locking rings are:

First, locking ring used under fastener head in beveled opening, both centers and locates the fastener axially and radially, stabilizing fastener in locked position.

Second, using one or more locking ring locks two work members together, preventing torsional force from causing relative axial movement with only one fastener.

Third, SEMS (R), pre-assembled fastener to lock washer, are currently made only as a not separable purchased item. But a locking ring can easily be separately assembled and stay on the fastner by design of locking ring formed shape or with an abut ends ring that springs open slightly for gripping fastener, saving considerable cost.

Fourth, a plural fastener configured locking ring formed shape can be made for locating screws and holding them located in place for production assembly of one unitized item. This can save considerable assembly labor time, helping to automate screw tightening and locking by available multiple spindle multiple fastener tightening equipment.

Fifth, locking rings have no size limitation, require no size specific dies.

Sixth, locking rings are applicable for use with both left hand and right hand threaded fasteners.

Seventh, locking rings can lock joint work members, lock joint work members to fasteners, lock fasteners, and lock combinations thereof.

Eighth, both sealing and locking can be combined into one locking unit, offering corrosion protection within locked joint.

Ninth, a straight portion of prepared reversed twist sharp crest spring wire material can be used as a locking key when placed in prepared work member grooves. This provides both lateral and longitudinal axis locking, unlike a machine key in key slot which locks only laterally.

Tenth, gripping by lock ring can keep screw or fastener projecting through opening in place as preassembly, while awaiting nut.

Eleventh, use of two or more locking rings on fastener in work members with beveled openings prevents fastener wobble or movement, thereby stiffening joint for extreme service and vibration.

Twelfth, extended uses capability of locking ring device are evident and not available in known art washer type devices.

Thirteenth, bending of wire section with continuous beaming overcomes spring back of flange in curl forming.

BRIEF SUMMARY OF INVENTION

This invention pertains to a triangular spring wire stock made to include a series of reversed twists 120 degrees out of phase with previous twist. Exposed 60 degree sharp crests appear continuous wave like. Round shaped ring or other shape made of a portion of reversed wire require treating to perfect resilience in finished article. Active crests are always erect. Any surface clamped thereagainst at any attitude allows penetrating engagement at contact. Engagement is made continuous by resilient spring bending within wire at each contact lockingly. No flattening, no tangling, have shank gripping, have shank pinning vibrational resistance, less weight, less overall diameter, visually heatable, zero profile, sharper continuous locking edge, combineable with elastomer, and can be made scraplessly more economical compared to known art lock washers.

BRIEF DESCRIPTION OF SEVERAL VIEWS OF DRAWINGS

FIG. 1 is oblique view of round spring wire material, available in very long lengths, preferably corrosion resistant.

FIG. 2-A is oblique view of formed tri-crested concave elliptical spring wire rolled or die drawn by standard continuous long length processes from round wire.

FIGS. 2-B and 2-C are oblique views of alternate shapes of essentially triangular wire sections.

FIG. 3-A is oblique view of a straight portion of axially reversed twists concave tri-elliptic spring wire.

FIG. 3-B is a side view of one pitch of a straight portion of reverse twist concave tri-elliptic spring wire. Shown is a space portion opposite each wave crest.

FIG. 3-C is an end view of wire shown in FIG. 3-B.

FIG. 4 is perspective view of a formed essentially round locking ring shape made from reversed twist tri-crested wire.

FIG. 5-A is cross section viewed about vertical centerline of hollow flanged sheet metal work member, hollow pocket insert work member, and round shape locking ring of (FIG. 4), as loose assembled in preparation before curl die forming.

FIG. 5-B similar to FIG. 5-A, but after operation of curl die forming of upset flange, showing clamped and locked work members.

FIG. 6-A is cross section about vertical centerline of two work member with beveled opening each having coaxial groove and bevels and with rivet having three locking rings (FIG. 4), as loose assembled and in preparation before rivet forming.

FIG. 6-B similar to FIG. 6-A, but after operation of forming rivet, showing locked closed and centered on axis work member joint of zero added thickness.

FIG. 7-A is cross section viewed about vertical centerline of plate with beveled opening having coaxial groove, base with beveled opening having coaxial groove, socket cap screw through both openings, and with three locking rings (FIG. 4), as loose assembled and in preparation before threaded nut assembly.

FIG. 7-B similar to FIG. 7-A, but after assembly operation of adding and tightening threaded nut, showing closed joint that is locked, centered axially, and has cap screw in counter bored opening flush with plate with beveled opening.

FIG. 8-A is perspective view of combined molded sealing compound surrounding a locking ring (FIG. 4), having a round share.

FIG. 8-B is an enlarged cross section view taken from FIG. 8-A.

FIG. 9 is plan view of locking ring shape made for plural fastener gripping, plural fastener locating, and offering combined locking featured in unitized form.

FIG. 10 is exploded view of two work members showing open or close ended grooves and a straight locking key in between work members.

REFERENCE NUMERALS IN DRAWINGS

| | | | |
|---|---|---|---|
| 20 | Round spring wire | 61 | Shoulder contacting member |
| 22 | Concave tri-elliptic wire | 62 | Bevel engagement |
| 23 | Longitudinal bulge | 64 | Shoulder engagement |
| 24 | Reversed twists crests | 65 | Groove engagement |
| 25 | Reversed twists wire | 66 | Shank engagement |
| 26 | Axial reversed twists pitch | 68 | Axial center line |
| 28 | Not opposed crest contact | 73 | Plate with beveled opening |
| 30 | Central axis | 74 | Opening counter bore |
| 32 | Abut end | 77 | Base with beveled opening |
| 33 | Fusion joined ends | 78a | Socket cap screw |
| 34 | Locking ring | 78b | Screw thread extending |
| 44 | Joint axial center line | 79 | Screw shank |
| 46 | Flanged hollow work member | 80 | Gripping cap screw shank |
| 47a | Upset sheet metal flange | 81 | Gripping screw threads |
| 47b | Curl formed flange | 82 | Cap screw shoulder |
| 48 | Locating surface | 83 | Opening and screw vertical center line |
| 50 | Hollow pocket insert | 85 | Threaded nut |
| 51 | Hollow pocket insert surface | 86 | Shank engagement |
| 52 | Insert engagement | 87 | Treads engagement |
| 53 | Flange engagement | 88 | Nut face engagement |
| 54 | Member with beveled opening | 91 | Sealing lockring |
| 55 | Opening | 92 | Molding compound |
| 56 | Bevel | 93 | Locking polyring |
| 57a | Rivet | 94 | Center line locations |
| 57b | Rivet shank | 95 | Gripping at crests |
| 58 | Gripping rivet shank | 96 | Grooved member |
| 59 | Coaxial groove | 98 | Proper straight groove |
| 60 | Formed rivet head | 99 | Straight locking key |

DETAILED DESCRIPTION OF THE INVENTION

Static Structure

Triangular wire made from round spring wire is processed to have a series of reversed twists about 120 degrees out of phase from previous twist appearing wave like, as three 60 degree sharp crests along wire length. A portion of such wire, formed such as washer like, is shape formed into essentially round ring and treated to obtain resilience desired. Structure described is a locking ring.

Operational Principle

A locking ring subjected to compression force makes contacts with surfaces thereagainst at sharp crest having space opposite. Contact force reaction components are primarily bending and include tension and torsion acting within wire material. Effect is shortened axial length as slightly reduced ring diameter. External effect is engagement of sharp crests into surfaces in proportion to limit of penetration and resiliency. Locking action occurs continuously by spring engaged contacting.

Description—Figures

Material views and elements include oblique views of a round spring wire 20 FIG. 1. Round wire made into a concave tri-elliptic wire 22 is shown in FIG. 2-A. Triangular variations include concave-elliptic wire with a longitudinal bulge 23 FIG. 2-b, and convex tri-elliptic wire in FIG. 2-C. Oblique view of processed triangular wire, as described in static structure, is shown in FIG. 3-A, as a reversed twists wire 25 having reverse twists crests 24. FIG. 3-B shows side view of a axial reversed twists pitch 26 and a not opposed crest contact 28 having opposite space at five locations and a central axis 30. FIG. 3-C shows end view of FIG. 3-B, where the crests show attitude as full circle. FIG. 4 is oblique view showing a formed ring shape made of a portion of the reversed twists wire with an abut end 32 or a fusion joined ends 33 of a locking ring 34. The locking ring will operate lockingly in compression caused by engagement of sharp crests.

Joint by forming is shown in sectional views FIG. 5-A and 5-B. Shown is a point axial center line 44, with a flanged hollow work member 46. This is generally sheet metal and includes a upset sheet metal flange 47a having a locating surface 48. The flange extends through a hollow pocket insert 50, adjacent as located by the flange surface. A locking ring is located adjacent to the locating surface and adjacent to a hollow pocket insert surface 51 coaxially in loose assembly. The next and final assembly operation is press curl forming as shown in FIG. 5-B. This FIG. 5-B shows axial centering with the locking ring sandwiched between a curl formed flange 47b and the hollow insert surface. This joint operates by penetration of sharp crests as occur at a hollow insert engagement 52 and at a flange engagement 53 as axially centered, locked, and permanently closed.

Joint by riveting in sectional view FIG. 6-A has two of a member with beveled hole 54, having a opening 55, and a bevel 56. Also shown is a rivet 57a with a rivet shank 57b extending through the openings with two of the locking rings shown at a gripping rivet shank 58 and adjacent to the bevel. One other locking ring is adjacent sandwiched by a coaxial groove 59 correspondingly opposite. FIG. 6-A is loosely assembled. This assembly preparation is made before next operation shown in FIG. 6-B, having a formed rivet head 60 shown with a shoulder contacting member 61 in a tightly closed joint. This joint operates by penetration at a bevel engagement 62, a shoulder engagement 64, a shank engagement 66, and at a groove engagement 65 as locked and positioned on a axial center line 68 to be permanently closed.

Joint by screw and nut in sectional view FIG. 7-A has a plate with beveled opening 73, a opening counter bore 74, a coaxial groove 59, bevels 56, a base with beveled opening 77, and through which openings is a socket cap screw 78a. A screw threads extending 78b and a screw shank 79 are shown loose assembled with three of the locking rings. They are sandwiched by the coaxial grooves, adjacent to two of the bevels, gripping a cap screw shank 80, a gripping screw threads 81, and adjacent to a cap screw shoulder 82. The screw threads extending are on a openings and screw vertical center line 83. This preparation is made ready for next assembly operation FIG. 7-B showing a threaded nut 85 screwed onto screw threads of the socket cap screw to both close joint and lock joint together. FIG. 7-B also shows a locking ring sandwiched between the bevel and the cap screw, between the coaxial grooves, and between bevel, screw shank, and nut, as clamped assembly. This joint operates by penetration of reversed twists crests shown at bevel engagement 62, at shoulder engagement 64, at a shank engagement 86, at a threads engagement 87, at a nut engagement 88, and at the groove engagement 65.

FIG. 8-A is perspective view of a sealing locking 91 showing a molding compound 92 surrounding the locking ring, continuously along wire axial length. FIG. 8-B is an enlarged typical crests section, b—b. The inventor believes operation of sharp crests would penetrate through molding compound where contacting yet provide suitable sealing and locking in designed joint.

FIG. 9 shows a locking polyring 93 in plan view of wire with the reversed twists crests in flat plane as configured in a shape like a series of open loops. Loops have a gripping at crests 95 and positions for locating plural fasteners, fasteners not shown, as at a center line locations 94. Operation of gripping is by resilient spring caused friction.

FIG. 10 is an exploded view of two of a grooved member 96 with a proper straight groove 98, as prepared for engagement of the reversed twists crests. Opposed grooves sandwich a straight locking key 99, made from the reversed twists wire. The straight grooves are made vee shape or rounded shape and made open ended or close ended. Operation is by engagement of sharp crests with grooved members clamped closed, means for closing not shown.

From the description above, twenty five advantages and new features of my locking ring device become evident:

(1) More sharp crests than tooth type lock washers are available by choosing axial reverse twist pitch for processing tri-elliptical wire.
(2) Contacting of multiple sharp crests are constant erect.
(3) Locking rings with joined or abut ends are tangle free.
(4) The expense of pre-assembled SEMS (R) type lock washer on special fasteners is reduced by using a locking ring with gripping built in for separate assembly onto standard fasteners.
(5) A continuous spring action of a multitude of erect sharp crests effectively locks joint subjected to severe vibration.
(6) Locking ring has smaller outside diameter than screw head, so it fits under shoulder of a socket cap screw in a counter bored opening, saving space and joint thickness.
(7) Fastener length and joint thickness are reduced by use of locking ring in beveled opening.
(8) Lighter weight locking ring is made possible by triangular shape wire.
(9) More pleasing joint appearance is possible from locking ring assembled out of view.
(10) Triangular sharp crests allow deep penetration.
(11) Scrapless manufacture helps give lowest unit cost.
(12) Plural fasteners are gripped and located by one locking assembly as multiple fastener unit.
(13) Left or right hand thread fasteners are properly locked.
(14) Size range is unlimited so with a larger diameter locking ring, more penetrating sharp crests are available.
(15) Locking of both joint members and of fasteners stiffens joint, prevents axial joint rotation, and fastener wobble.
(16) Leakage sealing and locking are combined in one unit.
(17) Locking key can be made of a straight portion of reverse twist triangular wire for lateral and axial joint locking.
(18) Manufacturing assembly is aided by locking ring device gripping bolt and holding bolt in place while awaiting nut assembly regardless of screw attitude.
(19) Using plural locking rings can stabilize fastener by preventing fastener from wobbling in opening.
(20) Locking two joint work members together to surround locking ring by forming, makes a joint that resists movement from torsional forces.
(21) Use of locking ring in beveled hole axially centers bolt or screw.
(22) Locking rings have extended uses capability.
(23) Locking ring overcome spring back in forming.
(24) Locking rings use spring material efficiently.
(25) Use of locking ring having lowest unit cost and quick assembly features help to lower production assembly cost.

Summary, Ramifications, and Scope

Necessarily, FIGS. 5,6,7,8,9, and 10 are presented to shown before and after cross sections of curl formed, riveted, and screw thread, locking joints and configurations. My invention of locking ring has unique features used therein and further inventions of curl formed flange locking, coaxial groove locking, bevel joint shank locking, pinned joint locking, plural fastener unitized locking, sealed ring locking, straight key locking, and assemblies with fasteners. Featured use with standard commercial fasteners influence low cost and provide joining advantages such as axial centering combined with work piece opening alignment, zero added thickness within joint to minimize through fastener length, and combined locking shoulder and shank at bolt head. Additionally, gripping shank by locking ring pre-assembled thereto accomplish SEMS (R) like assembly for standard fasteners. Locking axially, laterally, and at all contact force attitudess make my invention purposeful.

The scope of usage of this invention is rewarding in the scrapless use of materials by continuous manufacturing processes. Triangular wire structure and further efficiency of configuration yield minimum weight and size of locking ring. Ring rather than washer configuration is advantageous in keeping locking device hidden from view. Locking rings for large size fastener size or special shapes are non restrictive and economical, especially compared to die stamped lock washers. Combined sealing and locking functions as integral sealing locking may interchange at any or all of the locking ring locations shown.

Although the descriptions above contain many specifications, these should not be construed as limiting the scope of this invention, but as providing of some of the illustrations of some of the presently preferred embodiments of the invention. For example; a twisted crest configuration, a color coded compound for sealing locking ring size identification or sealing type identification, a locking ring used in sheet metal round hole to engage inside diameter surface and also engage shank of through passing object so as to eliminate extra cost of hole with key notch or flats, a same size use of plural locking rings assembled and gripping onto bolt with carriage type head to eliminate square shank on carriage bolt and also eliminate square receiving hole by a proper size for engagement of receiving round hole, a locking ring to be used with a flat washer having a prepared beveled hole, a locking ring formed in other than flat plane, a locking ring to lock flat head screws where a prepared grooved in countersink is provided, and a use in locking non-metal work members or fasteners.

Thus, the scope of the invention should be determined by the appended claims and their legal equivalents, rather than by the examples given.

I claim:

1. A locking device comprising stock having a three corner cross-section portion and having a plurality of reversed twists in the cross-section portion.

2. The locking device of claim 1 wherein each twist is out of phase with at least one other twist.

3. The locking device of claim 2 wherein each twist is about 120 degrees out of phase with the nearest other twist.

4. The locking device of claim 1 wherein the stock is substantially curved.

5. The locking device of claim 4 wherein the stock is substantially circular shape.

6. The locking device of claim 1 wherein at least one corner is adapted to contact the surface of a first workpiece and at least one other corner is adapted to contact the surface of a second workpiece to fasten the first workpiece to the second workpiece.

7. The locking device of claim 1 wherein at least one corner is adapted to contact the surface of a shaft of a first workpiece and at least one other corner is adapted to contact the surface of a second workpiece to fasten the first workpiece to the second workpiece.

8. The locking device of claim 1 wherein at least one corner is adapted to contact the surface of a threaded shaft of a first workpiece and at least one other corner is adapted to contact the surface of a second workpiece to fasten the first workpiece to the second workpiece.

9. The locking device of claim 1 wherein the stock has a substantially straight longitudinal portion.

10. The locking device of claim 1 wherein the stock is substantially straight between at least two corners.

11. The locking device of claim 1 wherein the stock is convex between at least two corners.

12. The locking device of claim 1 wherein the stock is concave between at least two corners.

13. The locking device of claim 1 wherein the stock is surrounded by a material adapted to resist fluid flow.

14. The locking device of claim 13 wherein the material surrounding the stock comprises a molding compound.

15. The locking device of claim 1 in combination with two workpieces to be fastened with the locking device positioned between the two workpieces and the locking device gripping the two workpieces to form a fastened connection having torsional resistance.

16. The locking device of claim 1 wherein each reversed twist has a crest.

17. The locking device of claim 16 in combination with two workpieces to be fastened with the locking device positioned between the two workpiece and the locking device gripping the two workpieces with resilient spring force friction at the crests of the reversed twist.

18. The locking device of claim 17 in combination with two workpieces to be fastened wherein at least one corner of the locking device is adapted to contact a surface of a shaft of one workpiece and at least one corner of the locking device is adapted to contact the surface of the other workpiece.

19. The locking device of claim 17 in combination with two workpieces to be fastened wherein at least one corner of the locking device is adapted to contact the surface of a threaded shaft of one workpiece and at least one corner of the locking device is adapted to contact the surface of the other workpiece.

20. The locking device of claim 17 in combination with two workpieces wherein the two workpieces define a joint space and the locking device is adapted to rip the two workpieces without increasing the thickness of the joint space.

21. A means for fastening at least one workpiece to a second workpiece with said means comprising a stock having a three corner cross-section portion and having a plurality of reversed twists in the cross-section portion.

22. The means for fastening of claim 21 wherein each twist is out of phase with at least one other twist.

23. The means for fastening of claim 21 wherein each twist is about 120 degrees out of phase with the nearest other twist.

24. The means for fastening of claim 21 wherein the stock is substantially curved.

25. The means for fastening of claim 21 wherein the stock is substantially circular shape.

26. The means for fastening of claim 21 wherein at least one corner is adapted to contact the surface of a first workpiece and at least one other corner is adapted to contact the surface of a second workpiece to fasten the first workpiece to the second workpiece.

27. The means for fastening of claim 21 wherein at least one corner is adapted to contact the surface of a shaft of a first workpiece and at least one other corner is adapted to contact the surface of a second workpiece to fasten the first workpiece to the second workpiece.

28. The means for fastening of claim 21 wherein at least one corner is adapted to contact the surface of a threaded shaft of a first workpiece and at least one other corner is adapted to contact the surface of a second workpiece to fasten the first workpiece to the second workpiece.

29. The means for fastening of claim 21 wherein the stock has a substantially straight longitudinal portion.

30. The means for fastening of claim 21 wherein the stock is substantially straight between at least two corners.

31. The means for fastening of claim 21 wherein the stock is concave between at least two corners.

32. The means for fastening of claim 21 wherein the stock is convex between at least two corners.

33. The means for fastening of claim 21 wherein the stock is surrounded by material to resist fluid flow.

34. The means for fastening of claim 33 wherein the material surrounding the stock comprises a molding compound.

35. The means for fastening of claim 21 in combination with two workpieces to be fastened and the means for fastening positioned between the two workpieces with the means for fastening gripping the two workpieces to form a fastened connection having a torsional resistance.

36. The means for fastening of claim 21 wherein each reversed twist has a crest.

37. The means for fastening of claim 36 in combination with two workpieces to be fastened and the means for fastening positioned between the two workpieces and the means for fastening gripping the two workpieces with resilient elastic spring force friction at the crests of the reversed twists.

38. The means for fastening of claim 36 in combination with two workpieces to be fastened wherein at least one corner of the means for fastening is adapted to contact a surface of a shaft of one workpiece and at least one corner of the means for fastening is adapted to contact the surface of the other workpiece.

39. The means for fastening of claim 36 in combination with two workpieces to be fastened wherein at least one corner of the means for fastening is adapted to contact a surface of a threaded shaft of one workpiece and at least one corner of the means for fastening is adapted to contact the surface of the other workpiece.

40. The means for fastening of claim 36 in combination with two workpieces wherein the two workpieces define a joint space and the means for fastening is adapted to grip the two workpieces without increasing the thickness of the joint space.

* * * * *